US010730491B2

(12) United States Patent
Krucinski et al.

(10) Patent No.: US 10,730,491 B2
(45) Date of Patent: Aug. 4, 2020

(54) ENERGY-BASED ANTISKID BRAKE CONTROL SYSTEM

(71) Applicant: GOODRICH CORPORATION, Charlotte, NC (US)

(72) Inventors: Martin Krucinski, Glastonbury, CT (US); Richard A. Poisson, Avon, CT (US)

(73) Assignee: GOODRICH CORPORATION, Charlotte, NC (US)

( * ) Notice: Subject to any disclaimer, the term of this patent is extended or adjusted under 35 U.S.C. 154(b) by 228 days.

(21) Appl. No.: 15/958,286

(22) Filed: Apr. 20, 2018

(65) Prior Publication Data

US 2019/0322255 A1    Oct. 24, 2019

(51) Int. Cl.
| | |
|---|---|
| *B60T 8/1761* | (2006.01) |
| *B60T 8/17* | (2006.01) |
| *B60T 8/171* | (2006.01) |
| *B60T 8/172* | (2006.01) |
| *B60T 8/1763* | (2006.01) |
| *B64C 25/42* | (2006.01) |

(52) U.S. Cl.
CPC ......... *B60T 8/17616* (2013.01); *B60T 8/171* (2013.01); *B60T 8/1703* (2013.01); *B60T 8/1725* (2013.01); *B60T 8/17636* (2013.01); *B64C 25/426* (2013.01)

(58) Field of Classification Search
CPC .... B60T 8/17616; B60T 8/1703; B60T 8/171; B60T 8/1725; B60T 8/17636; B64C 25/426; B64C 25/42

USPC .......................................................... 701/71
See application file for complete search history.

(56) References Cited

U.S. PATENT DOCUMENTS

| | | | |
|---|---|---|---|
| 9,663,223 | B1 | 5/2017 | Harrison et al. |
| 9,783,173 | B2 | 10/2017 | Giazotto |
| 2009/0276133 | A1 | 11/2009 | May et al. |
| 2017/0174331 | A1 | 6/2017 | Georgin et al. |
| 2017/0355473 | A1 | 12/2017 | Cahill |
| 2018/0015911 | A1 | 1/2018 | Georgin |

FOREIGN PATENT DOCUMENTS

| | | |
|---|---|---|
| EP | 1674359 | 6/2006 |
| EP | 1676763 | 7/2006 |
| EP | 2821302 | 1/2015 |

OTHER PUBLICATIONS

European Patent Office, European Search Report dated Aug. 14, 2019 in Application No. 19168947.0.

*Primary Examiner* — Maceeh Anwari
(74) *Attorney, Agent, or Firm* — Snell & Wilmer L.L.P.

(57) ABSTRACT

Systems and methods are disclosed herein for controlling aircraft brakes. A brake control system may comprise a controller, and a tangible, non-transitory memory configured to communicate with the controller. The tangible, non-transitory memory having instructions stored thereon that, in response to execution by the controller, cause the controller to perform operations comprising: determining a braking power discrepancy of a wheel ($e_{P,i}$), comparing the braking power discrepancy of the wheel ($e_{P,i}$) to a threshold discrepancy value, and modulating a braking pressure applied to the wheel based on the comparison of the braking power discrepancy of the wheel ($e_{P,i}$) to the threshold discrepancy value.

17 Claims, 7 Drawing Sheets

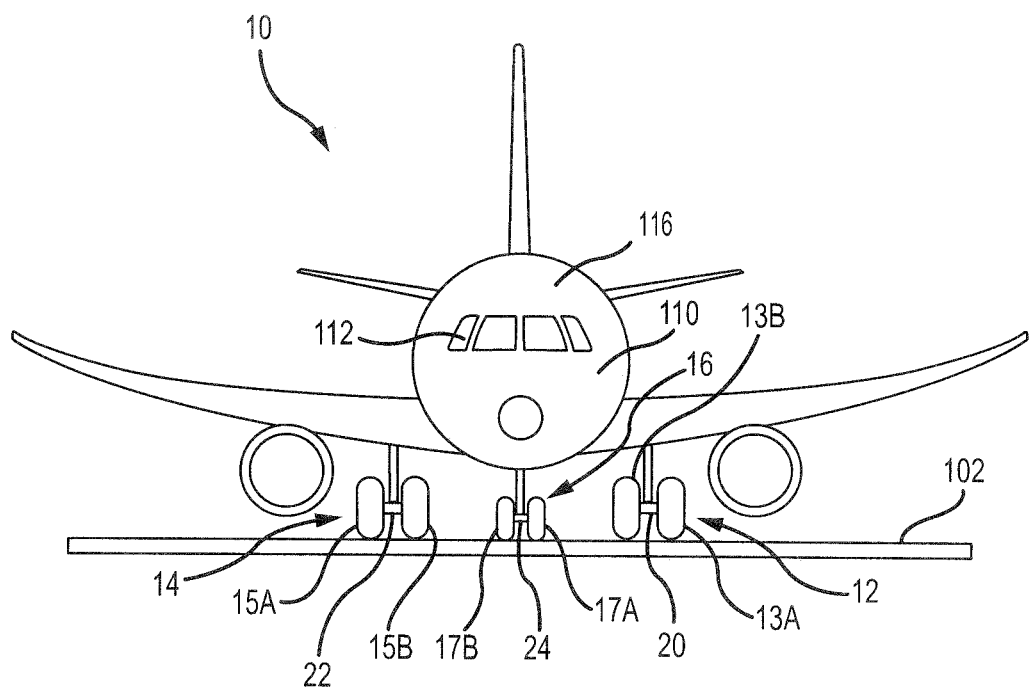
FIG.1
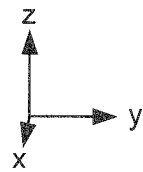

ENERGY-BASED ANTISKID BRAKE CONTROL SYSTEM

FIELD

The present disclosure relates generally to the field of brake control systems, and more specifically to systems and methods for aircraft brake control.

BACKGROUND

Aircraft often include one or more landing gear that are coupled to one or more wheels. Each wheel may have a brake, which is part of an aircraft braking system that is operatively coupled to the wheel to slow the wheel, and hence the aircraft, during, for example, landing or a rejected takeoff. Aircraft braking systems tend to utilize aircraft brake controllers. Current aircraft brake controllers detect impending wheel lockup by observing the individual aircraft wheel rotational velocities, and detecting when any of those decrease beyond a certain threshold, which indicates that an individual wheel is on the verge of locking up. A wheel-lockup event is undesirable during aircraft braking since it may lead to a wear through of the tire at the contact patch. This in turn could result in an explosion of the tire with loss of braking authority and generation of dangerous high energy debris which pose a risk of being ingested by the aircraft engines or damaging the aircraft structure itself.

SUMMARY

Systems and methods disclosed herein may be useful for controlling braking of aircraft wheels. As disclosed herein, in accordance with various embodiments, is a brake control system for an aircraft. The brake control system may comprise a controller and a tangible, non-transitory memory configured to communicate with the controller. The tangible, non-transitory memory may have instructions stored thereon that, in response to execution by the controller, cause the controller to perform operations which may comprise determining, by the controller, an aircraft braking power ($P_{kinetic}$); determining, by the controller, a braking power of a wheel ($P_{brake,i}$); determining, by the controller, a braking power discrepancy of the wheel ($e_{P,i}$) using the aircraft braking power and the braking power of the wheel; comparing, by the controller, the braking power discrepancy of the wheel ($e_{P,i}$) to a threshold discrepancy value; and modulating, by the controller, a braking pressure applied to the wheel based on the comparing the braking power discrepancy of the wheel ($e_{P,i}$) to the threshold discrepancy value.

In various embodiments, the controller may calculate the braking power discrepancy of the wheel ($e_{P,i}$) using equation $$e_{P,i} = \frac{1}{N_{wheel}} P_{kinetic} - P_{brake,i},$$

wherein $N_{wheel}$ is a total number of aircraft wheels.

In various embodiments, an aircraft data source may be in operable communication with the controller. Determining, by the controller, the braking power of the wheel ($P_{brake,i}$) may comprise receiving, by the controller, wheel speed data corresponding to a rotational speed ($\omega_i$) of the wheel; and calculating, by the controller, the braking power of the wheel ($P_{brake,i}$) using equation $P_{brake,i} = -\tau_i * \omega_i$, where $\tau_i$ is a braking torque acting on the wheel.

In various embodiments, determining, by the controller, the braking power of the aircraft ($P_{kinetic}$) may comprise receiving, by the controller, a longitudinal aircraft speed ($v_{ac}$) and an aircraft mass (m); and calculating, by the controller, the aircraft braking power ($P_{kinetic}$) using equation $$P_{kinetic} = \frac{d}{dt} E_{kinetic}$$

where $E_{kinetic}$ is an aircraft kinetic energy and is calculated using equation $$E_{kinetic} = \frac{1}{2} m v_{ac}^2.$$

At least one of the longitudinal aircraft speed ($v_{ac}$) or the aircraft mass (m) may be output from the aircraft data source.

In various embodiments, modulating, by the controller, the braking pressure may comprise reducing, by the controller, the braking pressure applied to the wheel if the braking power discrepancy of the wheel ($e_{P,i}$) is greater than the threshold discrepancy value. In various embodiments, reducing, by the controller, the braking pressure may comprise outputting, by the controller, a command signal to a brake actuator. The command signal may cause a translation of the brake actuator.

Also disclosed herein, in accordance with various embodiments, is a method for energy-based skid detection and wheel lock prevention. The method may comprise determining, by a controller, a braking power discrepancy of a wheel ($e_{P,i}$); comparing, by the controller, the braking power discrepancy of the wheel ($e_{P,i}$) to a threshold discrepancy value; and modulating, by the controller, a braking pressure applied to the wheel based on the comparing the braking power discrepancy of the wheel ($e_{P,i}$) to the threshold discrepancy value.

In various embodiments, determining, by the controller, the braking power discrepancy of the wheel ($e_{P,i}$) may comprise determining, by the controller, an aircraft braking power ($P_{kinetic}$); determining, by the controller, a braking power of the wheel ($P_{brake,i}$); and calculating, by the controller, the braking power discrepancy of the wheel ($e_{P,i}$) using equation $$e_{P,i} = \frac{1}{N_{wheel}} P_{kinetic} - P_{brake,i},$$

wherein $N_{wheel}$ is a total number of aircraft wheels.

In various embodiments, determining, by the controller, the braking power of the wheel ($P_{brake,i}$) may comprise receiving, by the controller, wheel speed data corresponding to a rotational speed ($\omega_i$) of the wheel; and calculating, by the controller, the braking power of the wheel ($P_{brake,i}$) using equation $P_{brake,i} = -\tau_i * \omega_i$, where $\tau_i$ is a braking torque acting on the wheel.

In various embodiments, determining, by the controller, the aircraft braking power of ($P_{kinetic}$) may comprise determining, by the controller, a longitudinal aircraft speed ($v_{ac}$), and an aircraft mass (m); and calculating, by the controller, the aircraft braking power ($P_{kinetic}$) using equation $$P_{kinetic} = \frac{d}{dt}E_{kinetic},$$

where $E_{kinetic}$ is an aircraft kinetic energy and is calculated using equation $$E_{kinetic} = \frac{1}{2}mv_{ac}^2.$$

In various embodiments, modulating, by the controller, the braking pressure may comprise reducing, by the controller, the braking pressure applied to the wheel if the braking power discrepancy of the wheel ($e_{P,i}$) is greater than the threshold discrepancy value. In various embodiments, reducing, by the controller, the braking pressure may comprise outputting, by the controller, a command signal to a brake actuator. The command signal may cause a translation of the brake actuator.

In accordance with various embodiments, a brake control system may comprise a controller, and a tangible, non-transitory memory configured to communicate with the controller. The tangible, non-transitory memory having instructions stored thereon that, in response to execution by the controller, cause the controller to perform operations which may comprise determining, by the controller, a braking power discrepancy of a wheel ($e_{P,i}$); comparing, by the controller, the braking power discrepancy of the wheel ($e_{P,i}$) to a threshold discrepancy value; and modulating, by the controller, a braking pressure applied to the wheel based on the comparing the braking power discrepancy of the wheel ($e_{P,i}$) to the threshold discrepancy value.

In various embodiments, determining, by the controller, the braking power discrepancy of the wheel ($e_{P,i}$) may comprise determining, by the controller, an aircraft braking power ($P_{kinetic}$); determining, by the controller, a braking power of the wheel ($P_{brake,i}$); and calculating, by the controller, the braking power discrepancy of the wheel ($e_{P,i}$) using equation $$e_{P,i} = \frac{1}{N_{wheel}}P_{kinetic} - P_{brake,i},$$

wherein $N_{wheel}$ is a total number of aircraft wheels.

In various embodiments, determining, by the controller, the braking power of the wheel ($P_{brake,i}$) may comprise receiving, by the controller, wheel speed data corresponding to a rotational speed ($\omega_i$) of the wheel; and calculating, by the controller, the braking power of the wheel ($P_{brake,i}$) using equation $P_{brake,i} = -\tau_i * \omega_i$, where $\tau_i$ is a braking torque acting on the wheel.

In various embodiments, determining, by the controller, the aircraft braking power ($P_{kinetic}$) may comprise determining, by the controller, a longitudinal aircraft speed ($v_{ac}$) and an aircraft mass (m); and calculating, by the controller, the aircraft braking power ($P_{kinetic}$) using equation $$P_{kinetic} = \frac{d}{dt}E_{kinetic}$$

where $E_{kinetic}$ is an aircraft kinetic energy and is calculated using equation $$E_{kinetic} = \frac{1}{2}mv_{ac}^2.$$

In various embodiments, modulating, by the controller, the braking pressure may comprise reducing, by the controller, the braking pressure applied to the wheel if the braking power discrepancy of the wheel ($e_{P,i}$) is greater than the threshold discrepancy value. In various embodiments, reducing, by the controller, the braking pressure may comprise outputting, by the controller, a command signal to a brake actuator. The command signal may causes a translation of the brake actuator.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the figures, wherein like numerals denote like elements.

FIG. 1 illustrates a perspective view of an aircraft, in accordance with various embodiments;

DETAILED DESCRIPTION

Figure 2:
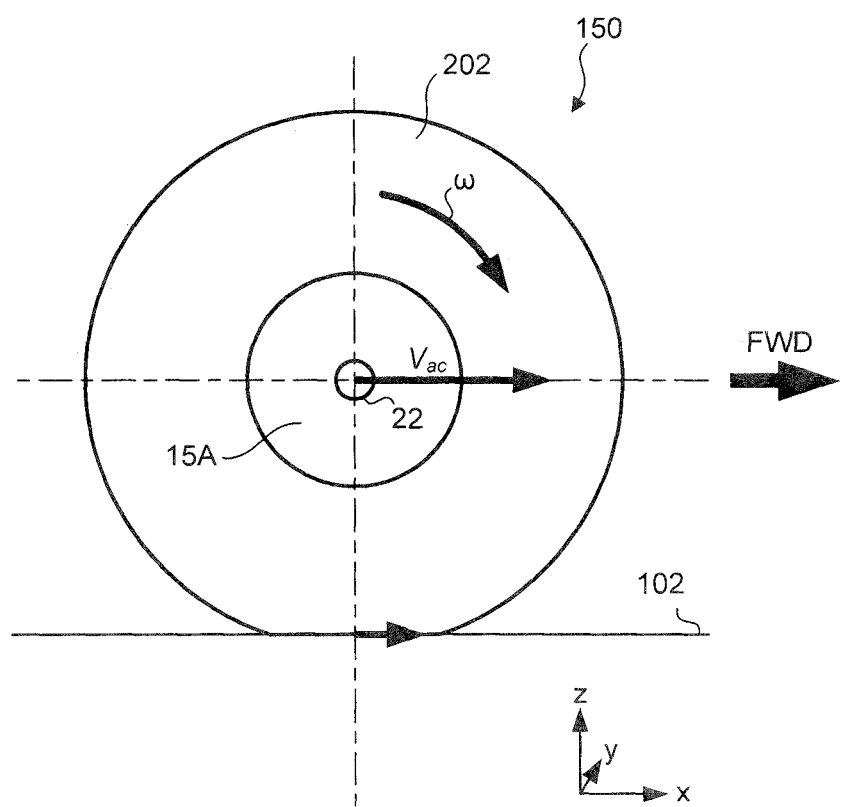
FIG. 2 illustrates a schematic view of a wheel/axle arrangement of the aircraft of FIG. 1, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the exemplary embodiments of the disclosure, it should be understood that other embodiments may be realized and that logical changes and adaptations in design and construction may be made in accordance with this disclosure and the teachings herein. Thus, the detailed description herein is presented for purposes of illustration only and not limitation. The steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

As used herein, "aft" refers to the direction associated with the tail (e.g., the back end) of an aircraft. As used herein, "forward" refers to the direction associated with the nose (e.g., the front end) of an aircraft, or generally, to the direction of flight or motion.

Systems and methods disclosed herein may be useful for detection of wheel skid and/or for prevention of wheel lockup. A wheel skid may occur in response to the braking force or braking pressure applied to a wheel exceeding the traction available to that wheel. In various embodiments, the disclosed systems and methods may use an energy-based condition to compare the decrease in the aircraft kinetic energy to the developed braking energy in each individual aircraft wheel brake. During normal barking conditions (i.e., no wheel lockup) the energy changes are approximately equal. Accordingly, monitoring divergence in the aircraft kinetic energy and the braking energy of the individual wheel brakes can be used to determine impending wheel lockup.

Although the embodiments herein are described with reference to braking systems used in connection with aircraft, such embodiments are provided for example only as it is contemplated that the disclosures herein have applicability to other vehicles, such as automobiles and/or vehicles with brakes.

A controller as disclosed herein may include one or more processor. Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. System program instructions and/or controller instructions may be loaded onto a tangible, non-transitory, computer-readable medium (also referred to herein as a tangible, non-transitory, memory) having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

With reference to FIG. 1, an aircraft 10 on runway 102 is shown. In accordance with various embodiments, aircraft 10 may include landing gear such as landing gear 12, landing gear 14, and landing gear 16. Landing gear 12, landing gear 14, and landing gear 16 may generally support aircraft 10, when aircraft 10 is not flying, allowing aircraft 10 to taxi, take off, and land without damage. Landing gear 12 may include outboard wheel 13A and inboard wheel 13B coupled by an axle 20. Landing gear 14 may include outboard wheel 15A and inboard wheel 15B coupled by an axle 22. Landing gear 16 may include nose wheel 17A and nose wheel 17B coupled by an axle 24. The nose wheels may differ from the main wheels in that the nose wheels may not include a brake.

An XYZ axes is used throughout the drawings to illustrate the axial (y), forward (x) and vertical (z) directions relative to axle 22.

Aircraft 10 may comprise a controller 110 and pilot controls 112. Aircraft 10 may include a plurality of sensors that detect aircraft status information, such as an avionics unit or aircraft data source 116. Aircraft status information may mean any information relating to the status of an aircraft, for example, the presence of weight on wheels, aircraft velocity, aircraft acceleration, wheel position, wheel velocity, wheel acceleration, air temperature, the pressure applied to the brake stack during braking, global positioning system coordinates, aircraft location, aircraft position on a runway, or other aircraft data. An aircraft brake system may have access to various aircraft status information at any given time.

With reference to FIG. 2, a wheel/axle arrangement 150 is illustrated, in accordance with various embodiments. Wheel/axle arrangement 150 may comprise a tire 202, outboard wheel 15A, and axle 22. Tire 202 may be mounted to outboard wheel 15A. Outboard wheel 15A may be mounted to axle 22. Axle 22, outboard wheel 15A, and tire 202 may rotate together. During a braking maneuver, wheel/axle arrangement 150 may rotate at a rotational speed ω. Rotational speed ω may be specified as revolutions per minute (rpm) or radians per second (rad/s) of wheel/axle arrangement 150. Wheel/axle arrangement 150 may comprise a longitudinal aircraft speed $v_{ac}$. Longitudinal aircraft speed $v_{ac}$ may be specified as the linear speed (in feet per second (fps), miles per hour (mph), knots (kt), etc.) of wheel/axle arrangement 150 in the forward direction (i.e., the positive x-direction).

Figure 3A:
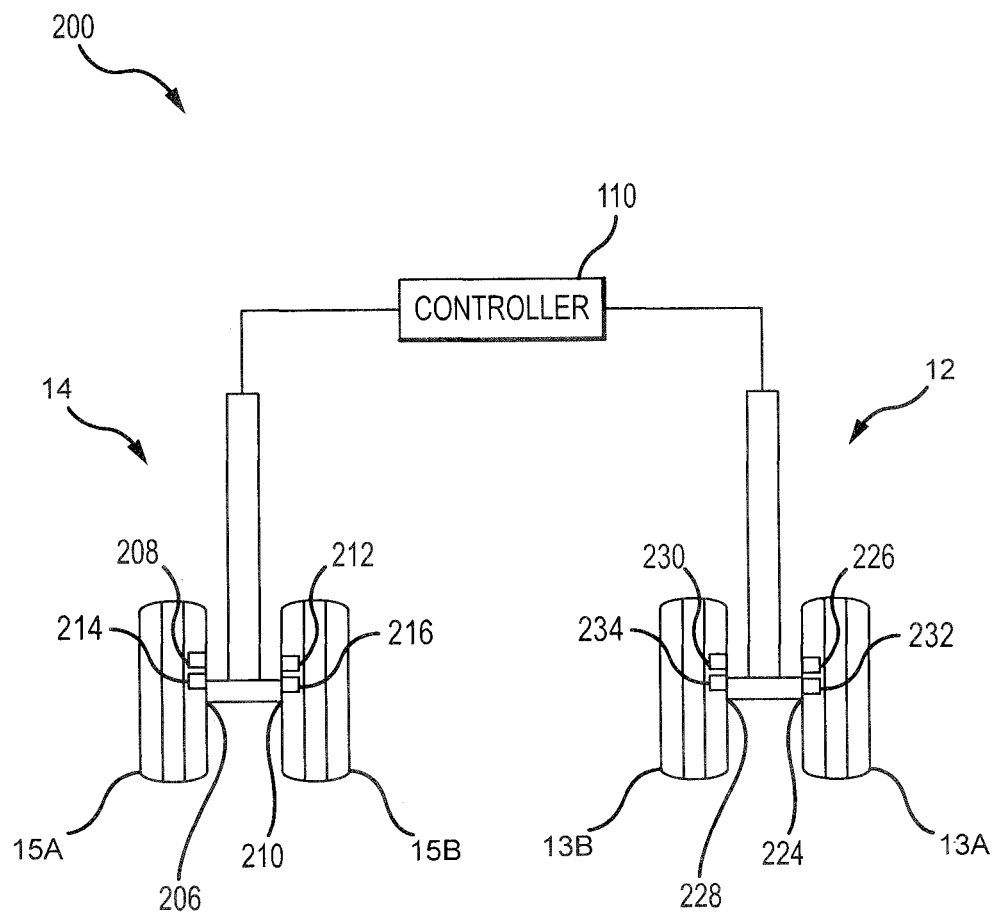
FIG. 3A illustrates landing gear of the aircraft shown in FIG. 1, in accordance with various embodiments.

With reference to FIG. 3A, a brake control system 200 for landing gear 12 and 14 is shown schematically in a front view, looking forward to aft, in accordance with various embodiments. Brake control system 200 may comprise landing gear 12 and landing gear 14. While FIG. 3A illustrates brake control system 200 comprising two landing gears with four total wheels, it is further contemplated and understood that the brake control system described herein may apply to various configurations of landing gear and wheels. Landing gear 12 may be laterally displaced from landing gear 14. Landing gear 14 may comprise a plurality of wheels, such as outboard wheel 15A and inboard wheel 15B. Outboard wheel 15A may comprise an outboard brake 206, and inboard wheel 15B may comprise an inboard brake 210. Outboard brake 206 and inboard brake 210 may be mounted in a conventional manner to outboard wheel 15A and inboard wheel 15B, respectively, to apply and release braking force or braking pressure on each respective wheel.

Landing gear 12 may comprise a plurality of wheels, such as outboard wheel 13A and inboard wheel 13B. Outboard wheel 13A may comprise an outboard brake 224, and inboard wheel 13B may comprise an inboard brake 228. Outboard brake 224 and inboard brake 228 may be mounted in a conventional manner to outboard wheel 13A and inboard wheel 13B, respectively, to apply and release braking force on each respective wheel.

Each landing gear 12, 14 may comprise a plurality of sensors. For example, each brake may include a sensor for detecting a braking pressure or a braking force applied to the respective wheel. Landing gear 14 may include a right outboard (ROB) wheel sensor 208, a right inboard (RIB) wheel sensor 212, a ROB brake sensor 214 and RIB brake sensor 216. ROB brake sensor 214 may detect a pressure or a force applied to outboard wheel 15A by outboard brake 206. RIB brake sensor 216 may detect a pressure or a force applied to inboard wheel 15B by inboard brake 210. ROB wheel sensor 208 and RIB wheel sensor 212 may be coupled to each respective wheel to measure one or more characteristics of each wheel, such as wheel position, wheel speed, and/or wheel acceleration, measured in terms of linear or angular position, linear or angular velocity, linear or angular acceleration, or other measurement unit.

Landing gear 12 may include a left outboard (LOB) wheel sensor 226, a left inboard (LIB) wheel sensor 230, a LOB brake sensor 232 and a LIB brake sensor 234. LOB brake sensor 232 may detect a pressure or a force applied to outboard wheel 13A by outboard brake 224. LIB brake sensor 234 may detect a pressure or a force applied to inboard wheel 13B by inboard brake 228. In various embodiments, brake sensors 214, 216, 232, 234 may detect a pressure applied to the respective wheel by a hydraulic or pneumatic actuator ram. In various embodiments, brake sensors 214, 216, 232, 234 may be force sensors, such as a load cell, which may detect a force applied to the respective wheel by an electromechanical actuator. LOB wheel sensor 226 and LIB wheel sensor 230 may be coupled to each respective wheel to measure one or more characteristics of each wheel, such as wheel position or displacement, wheel speed, and/or wheel acceleration, measured in terms of linear or angular position, linear or angular velocity, linear or angular acceleration, or other measurement unit. In various embodiments, wheel sensors 226, 230, 208, 212 may comprise wheel speed sensors that output signals indicative of angular velocity or angular displacement, for example, a Hall effect sensor, variable resistance sensor, or the like. Wheel sensors 226, 230, 208, or 212 may detect a change in a rate of deceleration of the wheels. In various embodiments, each of wheel sensors 226, 230, 208, 212 may comprise a plurality of sensors, for example, a wheel speed sensor and an accelerometer or other sensor. The wheel speed data for each wheel may be sent to controller 110. The wheel speed data sent to controller 110 may be used to calculate or estimate a rotation speed of each wheel, a slip ratio for each wheel, and/or a coefficient of friction of a runway surface.

Figure 3B:
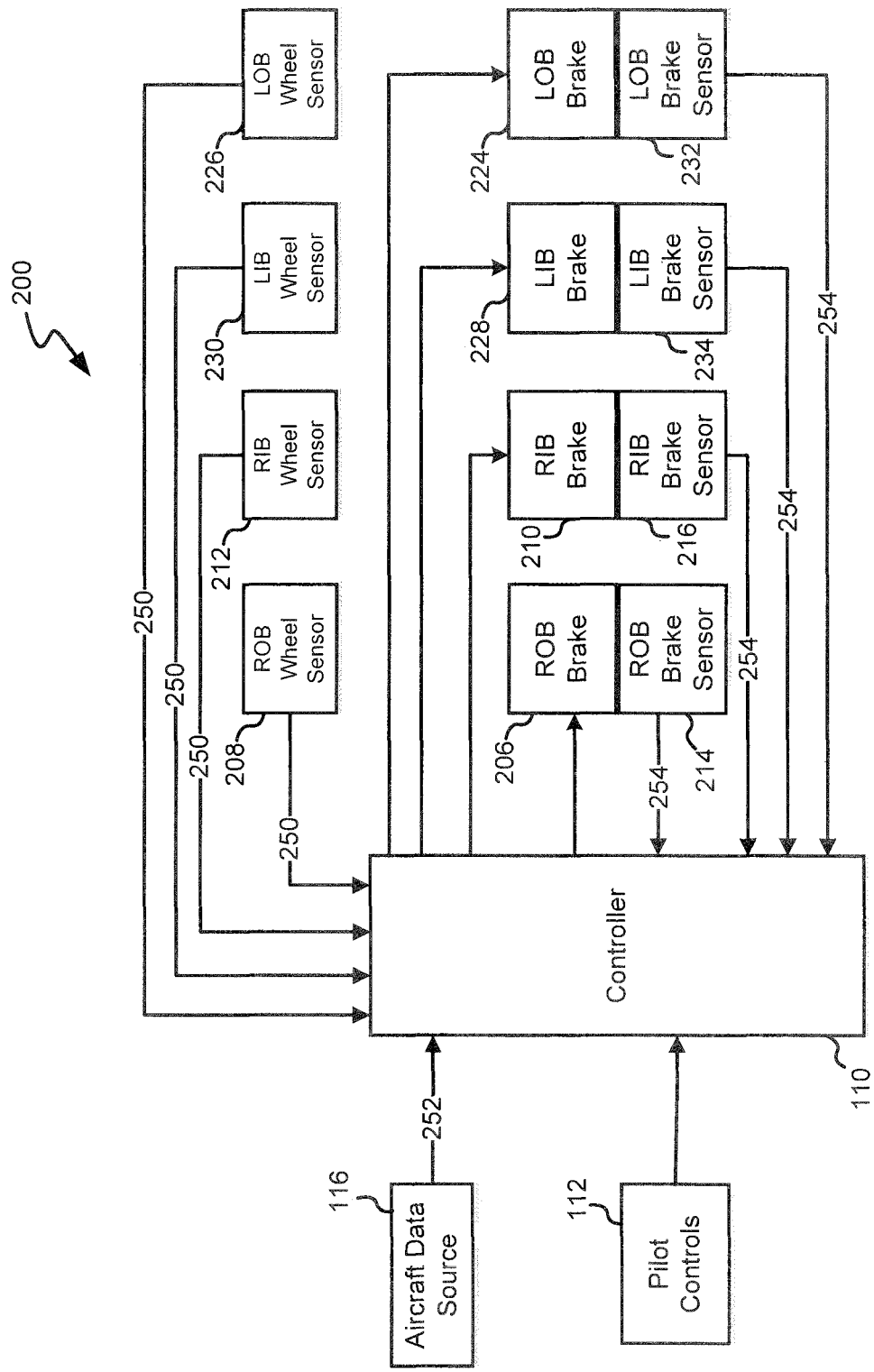
FIG. 3B illustrates a block diagram of a brake control system for the aircraft, in accordance with various embodiments.

With reference to FIG. 3B, a schematic block diagram of brake control system 200 is shown, in accordance with various embodiments. Brake control system 200 includes controller 110. In various embodiments, controller 110 may comprise control modules (such as autobraking control, brake control executive, brake pressure control unit, etc.) for controlling brakes 206, 210, 228, 224. As described in further detail below, controller 110 may be configured to detect a skidding, and/or prevent lockup, of wheels 13A, 13B, 15A, and 15B. In response to a wheel experiencing wheel skid, controller 110 may adjust the braking force or braking pressure of the brake corresponding to the skidding wheel.

Controller 110 may receive input from pilot controls 112 and/or aircraft data source 116 and may determine an amount of braking pressure or braking force to be applied to the brake disk stack of each brake 206, 210, 228, 224. Controller 110 may also receive input from wheel sensors 208, 212 226, 230, and from brake sensors 214, 216, 232, 234. Controller 110 may use data from the inputs to determine a reference wheel characteristic for one or more of the wheels of the braking system 200. A reference wheel characteristic may be a slip ratio of a wheel, a coefficient of friction experienced by a wheel, a braking pressure applied at the time of wheel skid, or other value correlating to the environment or performance associated with the wheel.

Controller 110 may be in communication with wheel sensors 226, 230, 208, 212. During normal operation, wheel sensors 226, 230, 208, 212 may transmit the wheel speed data 250 (i.e., rotation speed (o) of each wheel to controller 110. Controller 110 may further be in communication with an aircraft data source 116. Controller 110 may receive aircraft data 252 (e.g., weight on wheels, aircraft velocity, aircraft acceleration, wheel position, wheel velocity, wheel acceleration, air temperature, the pressure applied to the brake stack during braking, global positioning system coordinates, aircraft location, aircraft position on a runway, etc.) from aircraft data source 116. Controller 110 may also receive braking feedback data 254 from brake sensors 214, 216, 232, 234. Controller 110 may use the wheel speed data 250 received from wheel sensors 226, 230, 208, 212, the aircraft data 252 received from aircraft data source 116, the braking feedback data 254 output from brake sensors 214, 216, 232, 234, and/or the data output from pilot controls 112 to determine an energy discrepancy between the aircraft braking power $P_{kinetic}$ and the braking power of each wheel using the below equation 1:

$$e_{P,i} = \frac{1}{N_{wheel}} P_{kinetic} - P_{brake,i} \qquad \text{(Eq. 1)}$$

As used herein, "$e_{P,i}$" is the braking power discrepancy for wheel "i", "$N_{wheel}$" is the total number of brake system wheels (e.g., brake control system 200 includes four wheels: wheel 13A, wheel 13B, wheel 15A, and wheel 15B), "$P_{kinetic}$" is the aircraft braking power, and "$P_{brake,i}$" is the braking power of individual wheel i.

Aircraft braking power $P_{kinetic}$ can be calculated as follows:

$$P_{kinetic} = \frac{d}{dt} E_{kinetic} = mv\dot{v} = mv_{ac}a = Fv_{ac} \qquad \text{(Eq. 2)}$$

As used herein, "m" is the mass of the aircraft, "$v_{ac}$" is the longitudinal aircraft speed, "a" is the longitudinal acceleration of the aircraft, and "F" is the braking force being applied to the aircraft. Controller 110 may determine m, $v_{ac}$, and/or F from data received from aircraft data source 116, pilot controls 112, wheel sensors 226, 230, 208, 212, and/or brake sensors 214, 216, 232, 234.

Aircraft kinetic energy "$E_{kinetic}$" can be calculated as follows:

$$E_{kinetic} = \frac{1}{2} m v_{ac}^2 \qquad \text{(Eq. 3)}$$

Braking power of wheel i "$P_{brake,i}$" can be calculated as follows:

$$P_{brake,i} = -\tau_i * \omega_i \qquad \text{(Eq. 4)}$$

As used herein, "$\omega_i$" is the rotational speed of wheel i, and "$\tau_i$" is the braking torque acting on wheel i. Braking torque "$\tau_i$" may be a function of the friction between the brake and the disk and the pressure applied. Controller 110 may determine $\omega_i$ and $\tau_i$ using data received from aircraft data source 116, pilot controls 112, wheel sensors 226, 230, 208, 212, and/or brake sensors 214, 216, 232, 234. In various embodiments, braking torque $\tau_i$ may be measured using sensors (e.g., strain gauges) in the brake assembly. In various embodiments, braking torque $\tau_i$ may be calculated as follows:

$$\tau_i = k * p_i \quad \text{(Eq. 5)}$$

As used herein, "k" is a constant relating the brake pressure "$p_i$" being applied to wheel i to braking torque $\tau_i$. Controller 110 may determine the brake pressure $p_i$ being applied to wheel i using data received from aircraft data source 116, pilot controls 112, wheel sensors 226, 230, 208, 212, and/or brake sensors 214, 216, 232, 234.

Controller 110 may compare the braking power discrepancy $e_{P,i}$ of each wheel of aircraft 10 to a threshold discrepancy value. In response to a determination that a braking power discrepancy $e_{P,i}$ exceeds the threshold discrepancy value, controller 110 may adjust the braking force or braking pressure of the brake corresponding to wheel i. For example, if controller 110 determines the braking power discrepancy of outboard wheel 15A exceeds the threshold discrepancy value, controller 110 may send a command signal to outboard brake 206, thereby causing a reduction in the braking force or braking pressure being applied by brake 206 to outboard wheel 15A. In this regard, the command signal output by controller 110 may cause translation of an actuator of outboard brake 206.

The threshold discrepancy value may be a preselected value coded in controller 110. The threshold discrepancy value may be selected such that braking power discrepancy $e_{P,i}$ will exceed the threshold discrepancy value, and braking pressure will be reduced, before wheel lock occurs (i.e., before the slip ratio equals 1). In various embodiments, the threshold discrepancy value may be selected such that braking power discrepancy $e_{P,i}$ will exceed the threshold discrepancy value before the slip ratio equals, for example, 0.7. In various embodiments, the threshold discrepancy value may be selected such that braking power discrepancy $e_{P,i}$ will exceed the threshold discrepancy value before the slip ratio equals, for example, 0.5. It should be understood that 0.7 and 0.5 are merely example slip ratios and that the threshold discrepancy value may be selected to avoid (i.e., cause the wheel to remain below) any desired slip ratio. In various embodiments, controller 110 may determine the threshold discrepancy value using aircraft and environmental data, such that the threshold discrepancy value may change dynamically depending on, for example, longitudinal aircraft velocity, aircraft type, brake system type, brake system configuration, or the like.

In various embodiments, controller 110 may comprise a two-state finite-state machine configured to control a discrete switching between two control actions when an impending wheel lockup is detected (i.e., when braking power discrepancy $e_{P,i}$ is greater than the threshold discrepancy value). In various embodiments, controller 110 may send a command to set the brake pressure to, for example, zero, when a braking power discrepancy $e_{P,i}$ greater than the threshold discrepancy value is detected. In various embodiments, controller 110 may be configured to send a command to set the brake pressure to a pressure other than zero. For example, controller 110 may be configured to send a command to set the brake pressure to 10% of the brake pressure output from pilot controls 112, or to 20% of the brake pressure output from pilot controls 112, in response to determining the braking power discrepancy $e_{P,i}$ is greater than the threshold discrepancy value. Controller 110 may further be configured to determine when brake pressure may be reapplied to the wheel. In this regard, controller 110 may be configured to send a command re-activating the braking pressure after a predetermined time-delay (e.g., after 0.10 seconds, 0.5 second, or the like) and a predetermined slip recovery (e.g., a slip ratio less than 0.15, less than 0.2, etc.). In this regard, controller 110 may be configured to provide a tuning time and wheel slip-based hysteresis for anti-skid control and re-activation of the brake.

Figure 4A:
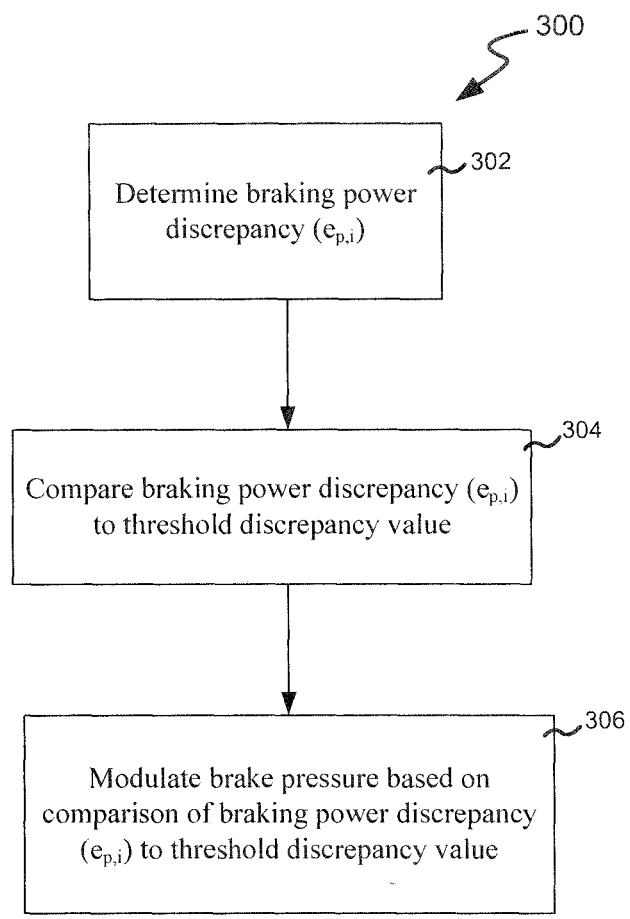
FIGS. 4A and 4B illustrate a method for energy-based skid detection, in accordance with various embodiments.

With reference to FIG. 4A, a method 300 for energy-based skid detection and wheel lock prevention is illustrated. Method 300 may comprise determining a braking power discrepancy of a wheel ($e_{P,i}$) (step 302), comparing the braking power discrepancy of the wheel to a threshold discrepancy value (step 304), and modulating a braking pressure applied to the wheel based on the comparison of the braking power discrepancy of the wheel to the threshold discrepancy value.

Figure 4B:
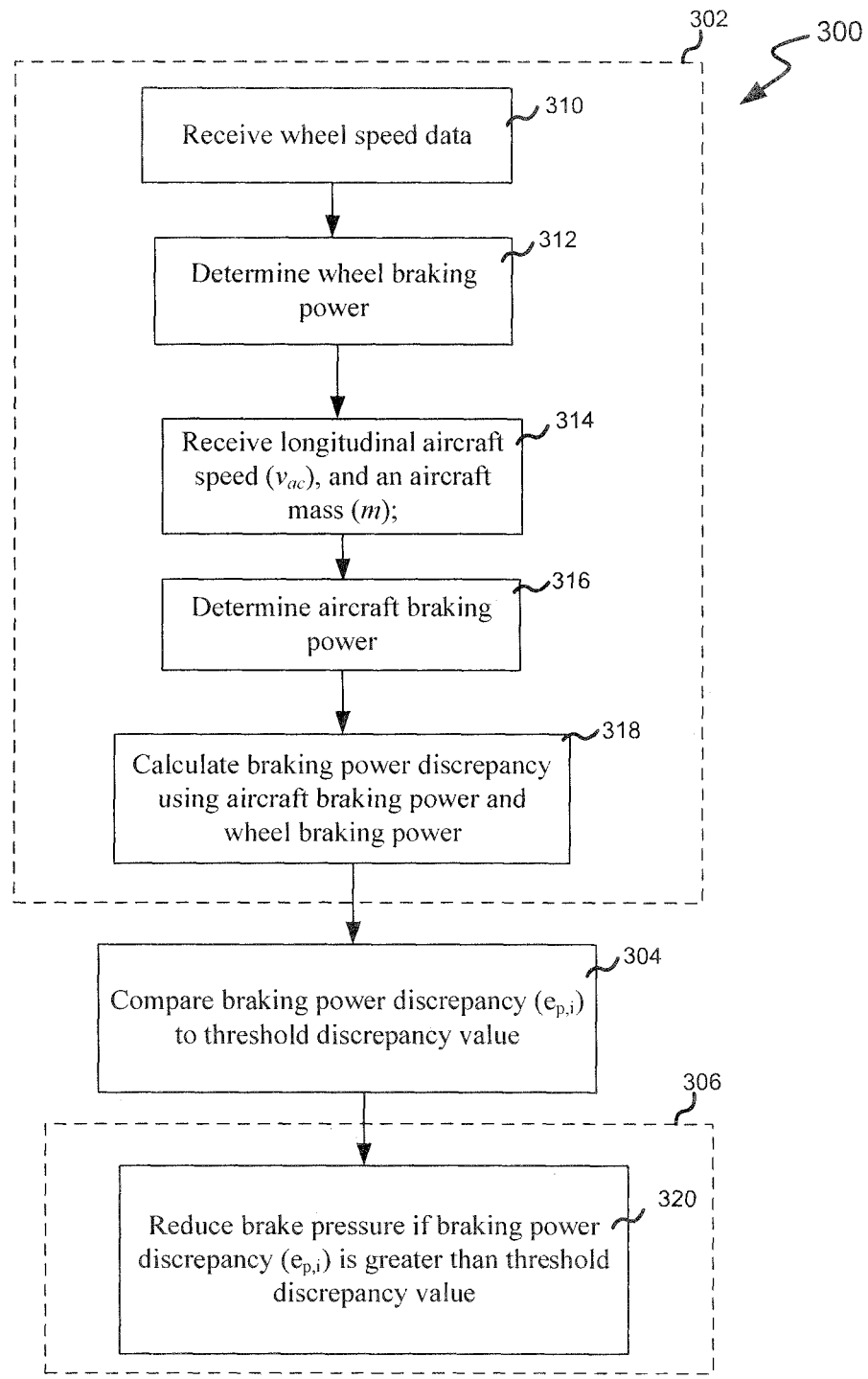

In various embodiments, with reverence to FIG. 4B, step 302 may comprise receiving wheel speed data corresponding to a rotational speed ($\omega_i$) of the wheel (step 310), and determining a braking power of the wheel ($P_{brake,i}$) (step 312). The braking power of the wheel ($P_{brake,i}$) may be calculated using equation $P_{brake,i} = -\tau_i * \omega_i$, where $\tau_i$ is the braking torque acting on the wheel. Step 302 may further comprise receiving a longitudinal aircraft speed ($v_{ac}$), and an aircraft mass (m) (step 314), and determining an aircraft braking power ($P_{kinetic}$) (step 316). The aircraft braking power ($P_{kinetic}$) may be calculated using equation $$P_{kinetic} = \frac{d}{dt} E_{kinetic}$$

where $E_{kinetic}$ is an aircraft kinetic energy and is calculated using equation $$E_{kinetic} = \frac{1}{2} m v_{ac}^2.$$

Step 302 may further comprise calculating the braking power discrepancy of the wheel using equation $$e_{P,i} = \frac{1}{N_{wheel}} P_{kinetic} - P_{brake,i},$$

wherein $N_{wheel}$ is a total number of aircraft wheels (step 318).

In various embodiments, step 306 may comprise reducing the braking pressure applied to the wheel, if the braking power discrepancy of the wheel is greater than the threshold discrepancy value (step 320). Step 320 may comprise outputting a command signal to a brake actuator, where the command signal causes a translation of the brake actuator.

Figure 5:
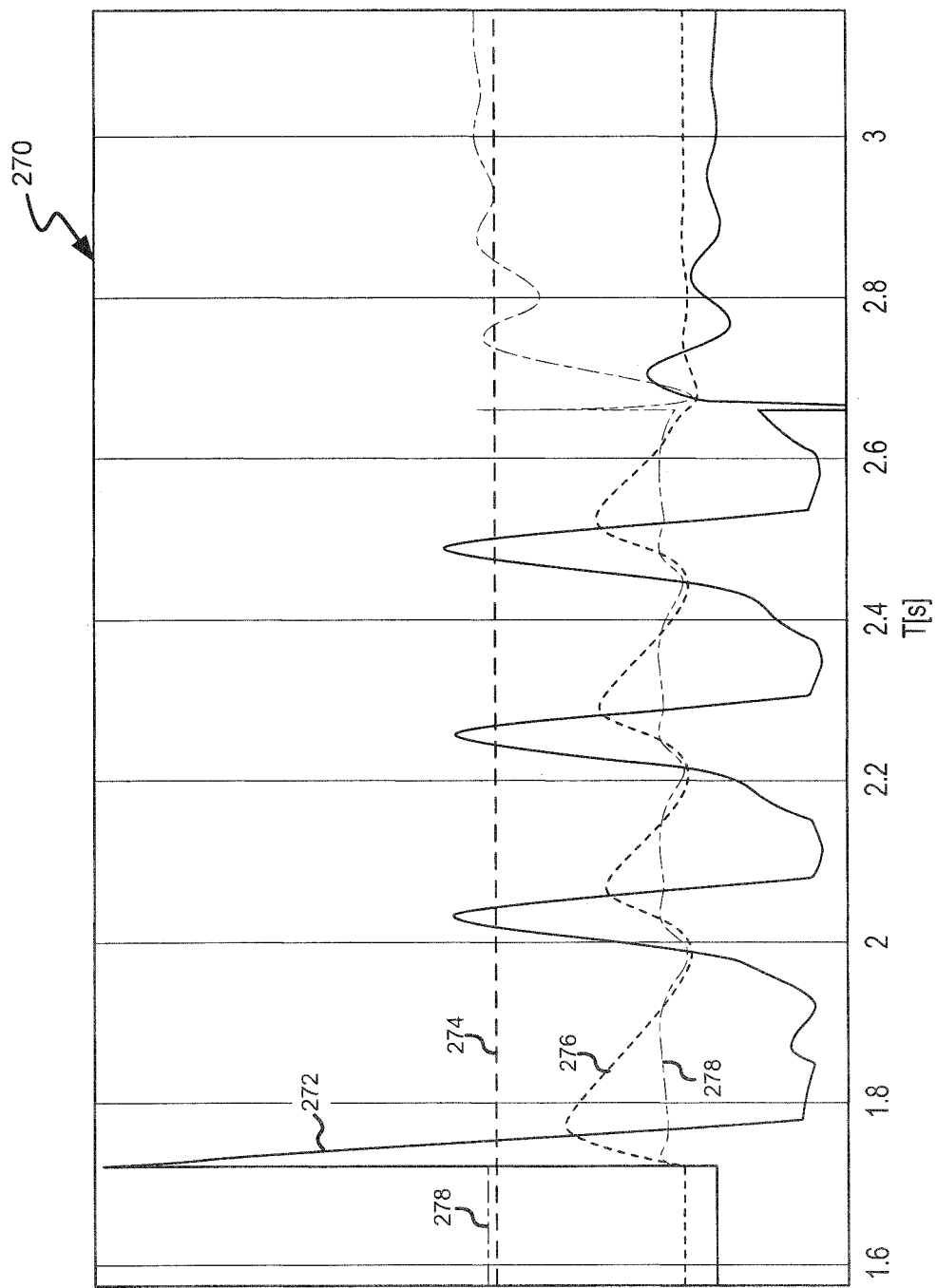
FIG. 5 illustrates a graphical representation of a simulated aircraft braking event employing energy-based skid detection, in accordance with various embodiments.

With reference to FIG. 5, a graphical representation 270 of a simulation of an aircraft employing brake control system 200 is illustrated. In graphical representation 270, line 272 illustrates braking power discrepancy ($e_{P,i}$) of an aircraft wheel, line 274 illustrates a threshold discrepancy value, line 276 illustrates a slip ratio of the aircraft wheel, and line 278 illustrates a friction coefficient that is developed at the tire and runway interface. As shown, at approximately time 1.72 seconds after touchdown, the tire encounters a surface of reduced friction (e.g., ice on the runway), thereby causing the friction coefficient (line 278) to decrease and the slip ratio of the wheel (line 276) to increase. At approximately 1.75 seconds, the slip ratio of the wheel (line 276) begins to decrease. The decrease in slip ratio is brought about by the braking power discrepancy (line 272) exceeding the threshold discrepancy value (line 274). Upon braking power discrepancy (line 272) exceeding threshold discrepancy value (line 274), controller 110 initiates a reduction of brake pressure thereby decreasing the slip ratio. Graphical representation 270 illustrates that each time the slip ratio begins to increase (i.e., at approximately 1.72 seconds, 1.98 seconds, 2.21 seconds, 2.46 second), the braking power discrepancy increases above the threshold discrepancy value (line 274), and a reduction of brake pressure is generated, thereby decreasing the slip ratio. Graphical representation 270 illustrates that the energy-based approach of brake control system 200 may detect impending wheel lock-up faster and earlier than traditional methods.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments. Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A brake control system for an aircraft, comprising:
   a controller;
   a tangible, non-transitory memory configured to communicate with the controller, the tangible, non-transitory memory having instructions stored thereon that, in response to execution by the controller, cause the controller to perform operations comprising:
   determining, by the controller, an aircraft braking power ($P_{kinetic}$);
   determining, by the controller, a braking power of a wheel ($P_{brake,i}$);
   determining, by the controller, a braking power discrepancy of the wheel ($e_{P,i}$) using the aircraft braking power and the braking power of the wheel, wherein the controller calculates the braking power discrepancy of the wheel ($e_{P,i}$) using equation $$e_{P,i} = \frac{1}{N_{wheel}} P_{kinetic} - P_{brake,i},$$

and wherein $N_{wheel}$ is a total number of brake control system wheels;
   comparing, by the controller, the braking power discrepancy of the wheel ($e_{P,i}$) to a threshold discrepancy value; and
   modulating, by the controller, a braking pressure applied to the wheel based on the comparing the braking power discrepancy of the wheel ($e_{P,i}$) to the threshold discrepancy value.

2. The brake control system of claim 1, further comprising an aircraft data source in operable communication with the controller.

3. The brake control system of claim 2, wherein determining, by the controller, the braking power of the wheel ($P_{brake,i}$) comprises:
   receiving, by the controller, wheel speed data corresponding to a rotational speed ($\omega_i$) of the wheel; and
   calculating, by the controller, the braking power of the wheel ($P_{brake,i}$) using equation $P_{brake,i} = -\tau_i * \omega_i$, where $\tau_i$ is a braking torque acting on the wheel.

4. The brake control system of claim 3, wherein determining, by the controller, the aircraft braking power ($P_{kinetic}$) comprises:
   receiving, by the controller, a longitudinal aircraft speed ($v_{ac}$) and an aircraft mass (m); and
   calculating, by the controller, the aircraft braking power ($P_{kinetic}$) using equation $$P_{kinetic} = \frac{d}{dt} E_{kinetic},$$

where $E_{kinetic}$ is an aircraft kinetic energy and is calculated using equation $$E_{kinetic} = \frac{1}{2} m v_{ac}^2.$$

5. The brake control system of claim 4, wherein at least one of the longitudinal aircraft speed ($v_{ac}$) or the aircraft mass (m) is output from the aircraft data source.

6. The brake control system of claim 1, wherein modulating, by the controller, the braking pressure comprises:

reducing, by the controller, the braking pressure applied to the wheel if the braking power discrepancy of the wheel is greater than the threshold discrepancy value.

7. The brake control system of claim 6, wherein reducing, by the controller, the braking pressure comprises:
outputting, by the controller, a command signal to a brake actuator, wherein the command signal causes a translation of the brake actuator.

8. A method for energy-based skid detection and wheel lock prevention, the method comprising:
determining, by a controller, a braking power discrepancy of a wheel ($e_{P,i}$) by:
determining, by the controller, an aircraft braking power ($P_{kinetic}$);
determining, by the controller, a braking power of the wheel ($P_{brake,i}$); and
calculating, by the controller, the braking power discrepancy of the wheel ($e_{P,i}$) using equation $$e_{P,i} = \frac{1}{N_{wheel}} P_{kinetic} - P_{brake,i},$$

wherein $N_{wheel}$ is a total number of aircraft wheels;
comparing, by the controller, the braking power discrepancy of the wheel to a threshold discrepancy value; and
modulating, by the controller, a braking pressure applied to the wheel based on the comparing the braking power discrepancy of the wheel ($e_{P,i}$) to the threshold discrepancy value.

9. The method of claim 8, wherein determining, by the controller, the braking power of the wheel ($P_{brake,i}$) comprises:
receiving, by the controller, wheel speed data corresponding to a rotational speed ($\omega_i$) of the wheel; and
calculating, by the controller, the braking power of the wheel ($P_{brake,i}$) using equation $P_{brake,i} = -\tau_i * \omega_i$, where $\tau_i$ is a braking torque acting on the wheel.

10. The method of claim 9, wherein determining, by the controller, the aircraft braking power ($P_{kinetic}$) comprises:
determining, by the controller, a longitudinal aircraft speed ($v_{ac}$), and an aircraft mass (m); and
calculating, by the controller, the aircraft braking power ($P_{kinetic}$) using equation $$P_{kinetic} = \frac{d}{dt} E_{kinetic},$$

where $E_{kinetic}$ is an aircraft kinetic energy and is calculated using equation $$E_{kinetic} = \frac{1}{2} m v_{ac}^2.$$

11. The method of claim 8, wherein modulating, by the controller, the braking pressure comprises:
reducing, by the controller, the braking pressure applied to the wheel if the braking power discrepancy of the wheel ($e_{P,i}$) is greater than the threshold discrepancy value.

12. The method of claim 11, wherein reducing, by the controller, the braking pressure comprises:
outputting, by the controller, a command signal to a brake actuator, wherein the command signal causes a translation of the brake actuator.

13. A brake control system, comprising:
a controller; and
a tangible, non-transitory memory configured to communicate with the controller, the tangible, non-transitory memory having instructions stored thereon that, in response to execution by the controller, cause the controller to perform operations comprising:
determining, by the controller, a braking power discrepancy of a wheel ($e_{P,i}$);
comparing, by the controller, the braking power discrepancy of the wheel ($e_{P,i}$) to a threshold discrepancy value; and
modulating, by the controller, a braking pressure applied to the wheel based on the comparing the braking power discrepancy of the wheel ($e_{P,i}$) to the threshold discrepancy value, wherein determining, by the controller, the braking power discrepancy of the wheel ($e_{P,i}$) comprises:
determining, by the controller, an aircraft braking power ($P_{kinetic}$);
determining, by the controller, a braking power of the wheel ($P_{brake,i}$); and
calculating, by the controller, the braking power discrepancy of the wheel ($e_{P,i}$) using equation $$e_{P,i} = \frac{1}{N_{wheel}} P_{kinetic} - P_{brake,i},$$

wherein $N_{wheel}$ is a total number of aircraft wheels.

14. The brake control system of claim 13, wherein determining, by the controller, the braking power of the wheel ($P_{brake,i}$) comprises:
receiving, by the controller, wheel speed data corresponding to a rotational speed ($\omega_i$) of the wheel; and
calculating, by the controller, the braking power of the wheel ($P_{brake,i}$) using equation $P_{brake,i} = -\tau_i * \omega_i$, where $\tau_i$ is a braking torque acting the wheel.

15. The brake control system of claim 13, wherein determining, by the controller, the aircraft braking power ($P_{kinetic}$) comprises:
determining, by the controller, a longitudinal aircraft speed ($v_{ac}$) and an aircraft mass (m); and
calculating, by the controller, the aircraft braking power ($P_{kinetic}$) using equation $$P_{kinetic} = \frac{d}{dt} E_{kinetic},$$

where $E_{kinetic}$ is an aircraft kinetic energy and is calculated using equation $$E_{kinetic} = \frac{1}{2} m v_{ac}^2.$$

16. The brake control system of claim 13, wherein modulating, by the controller, the braking pressure comprises reducing, by the controller, the braking pressure applied to the wheel if the braking power discrepancy of the wheel ($e_{P,i}$) is greater than the threshold discrepancy value.

17. The brake control system of claim 16, wherein reducing, by the controller, the braking pressure comprises:
    outputting, by the controller, a command signal to a brake actuator, wherein the command signal causes a translation of the brake actuator.

\* \* \* \* \*